US011584656B2

(12) United States Patent
Ketcham et al.

(10) Patent No.: US 11,584,656 B2
(45) Date of Patent: Feb. 21, 2023

(54) SOLID STATE CONVERSION OF POLYCRYSTALLINE MATERIAL

(71) Applicant: CORNING INCORPORATED, Corning, NY (US)

(72) Inventors: Thomas Dale Ketcham, Horseheads, NY (US); Xinghua Li, Horseheads, NY (US); Yan Wang, Horseheads, NY (US)

(73) Assignee: Corning Incorporated, Corning, NY (US)

(*) Notice: Subject to any disclaimer, the term of this patent is extended or adjusted under 35 U.S.C. 154(b) by 2 days.

(21) Appl. No.: 17/221,913

(22) Filed: Apr. 5, 2021

(65) Prior Publication Data

US 2021/0316999 A1  Oct. 14, 2021

Related U.S. Application Data

(60) Provisional application No. 63/006,967, filed on Apr. 8, 2020.

(51) Int. Cl.
*C01F 7/021* (2022.01)

(52) U.S. Cl.
CPC .......... *C01F 7/021* (2013.01); *C01P 2004/10* (2013.01); *C01P 2004/61* (2013.01)

(58) Field of Classification Search
CPC ...................................................... C01F 7/021
See application file for complete search history.

(56) References Cited

U.S. PATENT DOCUMENTS

| 5,427,051 A | 6/1995 | Maxwell et al. |
| 5,451,553 A | 9/1995 | Scott et al. |
| 6,299,681 B1 | 10/2001 | Azad et al. |
| 10,155,667 B2 | 12/2018 | Badding et al. |
| 10,581,115 B2 | 3/2020 | Badding et al. |

(Continued)

FOREIGN PATENT DOCUMENTS

| JP | 58-147024 A | 9/1983 |
| JP | 07-153686 A | 6/1995 |

OTHER PUBLICATIONS

GB Patent Application No. 2012811 2; Office Action dated Jan. 25, 2021, 2 pages; United Kingdom Patent Office.

(Continued)

*Primary Examiner* — James A Fiorito
(74) *Attorney, Agent, or Firm* — Russell Magaziner (57) ABSTRACT

Systems, devices, and techniques for manufacturing a crystalline material (e.g., large crystal material) through the solid state conversion of a polycrystalline material are described. A device may be configured to concurrently heat a volume of ribbon, such as an alumina ribbon, using multiple heat sources. For example, a first heat source may heat a first volume of the ribbon and a second heat source may concurrently heat a second volume, for example, within the first volume, where the ribbon may comprise polycrystalline material. The concurrent heating may drive grain growth in the polycrystalline material in at least the second volume, which may convert the polycrystalline material to crystalline material having one or more grains that are larger than one or more grains of the polycrystalline material. The processed ribbon may include a large crystal material or a single crystal material.

5 Claims, 6 Drawing Sheets

(56) References Cited

U.S. PATENT DOCUMENTS 10,766,165 B2  9/2020  Badding et al.
2009/0069168 A1  3/2009  Wei
2009/0081456 A1*  3/2009  Goyal ................ H01L 39/2461
428/397

OTHER PUBLICATIONS

Dillon et al., "Mechanism of "Solid-State" Single-Crystal Conversion in Alumina", Journal of the American Ceramic Society, vol. 90, 2007, pp. 993-995.
Dobrovinskaya et al., "Sapphire: Material, Manufacturing, Applications", 2009, 493 pages.
Kyocera Group Global Site, Available Online at <https://global.kyocera.com>, retrieved on Apr. 27, 2021, 9 pages.
M.N. Rahaman, Ceramic Processing and Sintering, CRC Press, 2003, 876 pages.
Scott et al., "Conversion of Polycrystalline Al2O3 into Single-Crystal Sapphire by Abnormal Grain Growth", Journal of the American Ceramic Society, vol. 85, 2002, pp. 1275-1280.
Thompson et al., "Conversion of Polycrystalline Alumina to Single-Crystal Sapphire by Localized Codoping with Silica", Journal of the American Ceramic Society, vol. 87, 2004, pp. 1879-1882.

\* cited by examiner

SOLID STATE CONVERSION OF POLYCRYSTALLINE MATERIAL

CROSS-REFERENCE TO RELATED APPLICATIONS

This application claims the benefit of priority under 35 U.S.C. § 119 of U.S. Provisional Application No. 63/006,967, filed Apr. 8, 2020, the content of which is incorporated herein by reference in its entirety.

TECHNICAL FIELD

The following relates generally to crystalline materials, and more specifically to converting a polycrystalline material to a crystalline material, such as a single crystal material or a large crystal material.

BACKGROUND

Crystalline materials having large grains (e.g., as compared to the grains of polycrystalline materials) may have physical, optical, and chemical properties that provide benefits across a range of industries and products. For example, single crystal materials, such as sapphire (e.g., single crystal alpha-alumina), may have high thermal conductivity, a wide transmission wavelength range, increased electrical insulation, and high strength and wear resistance, particularly at high temperatures. Accordingly, sapphire and other similar materials may be highly useful in various products and applications, such as optics (e.g., laser crystals, waveguides), electrical components (e.g., semiconductor devices, substrates for electronics), and ceramics (e.g., scratch-resistant electronics covers, wristwatch crystals), among others.

SUMMARY

The methods, devices, and materials of this disclosure each have several new and innovative aspects. This summary provides some examples of these new and innovative aspects, but the disclosure may include new and innovative aspects not included in this summary.

A method for manufacturing is described. The method may include heating, using a first heat source, a first volume of a ribbon, the ribbon including a polycrystalline material, and concurrently heating, using a second heat source while the ribbon is moving relative to at least the second heat source and using the first heat source, a second volume of the ribbon that is within the first volume, where heating using the first heat source and the second heat source may convert at least a portion of the polycrystalline material of the ribbon within the second volume to a crystalline material including one or more grains that are larger than a plurality of grains of the polycrystalline material.

An apparatus may include a processor, memory in electronic communication with the processor, and instructions stored in the memory. The instructions may be executable by the processor to cause the apparatus to heat, using a first heat source, a first volume of a ribbon, the ribbon including a polycrystalline material, and concurrently heat, using a second heat source while the ribbon is moving relative to at least the second heat source and using the first heat source, a second volume of the ribbon that is within the first volume, where heating using the first heat source and the second heat source may convert at least a portion of the polycrystalline material of the ribbon within the second volume to a crystalline material including one or more grains that are larger than a plurality of grains of the polycrystalline material.

Another apparatus may include means for heating, using a first heat source, a first volume of a ribbon, the ribbon including a polycrystalline material, and means for concurrently heating, using a second heat source while the ribbon is moving relative to at least the second heat source and using the first heat source, a second volume of the ribbon that is within the first volume, where heating using the first heat source and the second heat source converts at least a portion of the polycrystalline material of the ribbon within the second volume to a crystalline material including one or more grains that are larger than a plurality of grains of the polycrystalline material.

In some examples of the method and apparatuses described herein, concurrently heating the second volume using the second heat source may include heating at least a first surface of the ribbon using the first heat source, where heating at least the first surface of the ribbon heats the first volume of the ribbon, and concurrently heating a second surface of the ribbon different from the first surface, where the polycrystalline material may be converted to the crystalline material from the first surface of the ribbon and extending to a first depth of the ribbon from the first surface.

In some examples of the method and apparatuses described herein, concurrently heating the second volume using the second heat source may include scanning the second volume of the ribbon with the second heat source while the first volume and the second volume are heated by the first heat source.

Some examples of the method and apparatuses described herein may further include operations, features, means, or instructions for depositing, before concurrently heating using the first heat source and the second heat source, one or more seed crystals on the polycrystalline material of the ribbon, where an orientation of the crystalline material may be based on a shape of the one or more seed crystals, or an orientation of the one or more seed crystals, or both.

Some examples of the method and apparatuses described herein may further include operations, features, means, or instructions for moving the ribbon relative to the second heat source at a rate that is at least 0.2 inches per minute.

In some examples of the method and apparatuses described herein, the first heat source includes a convection-type heat source, or a first radiation-type heat source, or a combination thereof, for heating at least the first volume. In some examples of the method and apparatuses described herein, the second heat source may include a second radiation-type heat source for irradiating the second volume with photons, where the first volume may be larger than the second volume.

In some examples of the method and apparatuses described herein, the first heat source may include at least one of a flame, or an oven, or a furnace, or a microwave, and the second heat source may include at least one of a laser or a focused infrared source.

Some examples of the method and apparatuses described herein may further include operations, features, means, or instructions for heating the first volume of the ribbon using a third heat source, the first volume including a first subset of the polycrystalline material and a second subset of the crystalline material, and concurrently heating, using a fourth heat source while the ribbon is moving relative to at least the fourth heat source and using the third heat source, the second volume of the ribbon that may be within the first volume, where heating using the third heat source and the fourth heat source may convert at least a portion of the first subset of the polycrystalline material of the ribbon within the second volume to the crystalline material including the one or more grains that are larger than the plurality of grains of the polycrystalline material, and where a depth of the crystalline material of the ribbon may increase based on concurrently heating using the third heat source and the fourth heat source.

In some examples of the method and apparatuses described herein, heating using the first heat source and the second heat source may convert at least the portion of the polycrystalline material of the ribbon within the second volume to the crystalline material while the ribbon is in a solid state.

In some examples of the method and apparatuses described herein, the polycrystalline material of the ribbon may be at least partially sintered.

A device for manufacturing may include a support component for supporting a ribbon that includes a polycrystalline material, a moving component for moving the ribbon, a first heat source for heating a first volume of the ribbon, and a second heat source for concurrently heating a second volume of the ribbon that is within the first volume concurrently heated by the first heat source, the moving component configured to move the ribbon relative to at least the second heat source, where the first heat source and the second heat source are configured to convert at least a portion of the polycrystalline material of the ribbon to a crystalline material including one or more grains that are larger than a plurality of grains of the polycrystalline material based on heating the first volume and the second volume.

In some examples, the first heat source may be positioned to apply heat to at least a first surface of the ribbon and the second heat source may be positioned to apply heat to a second surface of the ribbon different than the first surface, where the polycrystalline material may be converted to the crystalline material from the first surface of the ribbon and extending to a first depth of the ribbon from the first surface.

In some examples, the first heat source may be positioned to apply heat to at least a first surface of the ribbon and the second heat source may be positioned to apply heat to the first surface of the ribbon, where the polycrystalline material may be converted to the crystalline material from the first surface of the ribbon and extending to a first depth of the ribbon from the first surface.

In some examples, the second heat source may include a radiation-type heat source configured to scan the second volume of the ribbon using a raster pattern, or a scanning pattern, or both.

In some examples, the device includes a tension component for applying tension to the ribbon to modify a shape of the ribbon while concurrently heating the first volume and the second volume.

A ribbon may include a first volume extending from a first side of the ribbon to a first depth of the ribbon and including a polycrystalline material, and a second volume extending from a second side of the ribbon opposite the first side of the ribbon to a second depth of the ribbon and including a crystalline material having a grain size of at least 100 micrometers and including one or more grains that are larger than a plurality of grains of the polycrystalline material, where the second depth is at least 1 micrometer.

In some examples, the polycrystalline material includes a polycrystalline ceramic material, or polycrystalline metal material, or a semiconductor material, where the crystalline material includes a sapphire material or a single crystal material.

In some examples, a lateral dimension of the grain size of the crystalline material may be at least 1 millimeter and a longitudinal dimension of the grain size is at least 1 millimeter.

In some examples, the second depth of the second volume may extend to about a thickness of the ribbon, the thickness of the ribbon being up to 1000 micrometers.

In some examples, the one or more grains of the crystalline material may be oriented in a first direction, where a basal plane of the crystalline material may be aligned with a plane of the ribbon based on the one or more grains of the crystalline material being oriented in the first direction.

DETAILED DESCRIPTION

Relatively large crystal materials, such as sapphire (e.g., single crystal alpha-alumina), have attracted industrial and research interest due to their unique properties and applications. For instance, because sapphire may not have as many grain boundaries, it may have superior properties compared to other materials (e.g., as compared to polycrystalline alumina (PCA), which has the same chemistry and crystalline phase). Other processes used for fabricating or manufacturing sapphire may include immersing a seed crystal in a melt and continuously pulling the material to form a crystal. However, this and other processes for manufacturing relatively large crystal materials, such as sapphire, are expensive and slow.

In particular, some manufacturing techniques may require extended time periods, pre-treatment processes, or both, to obtain relatively large crystal materials. As one example, techniques for manufacturing sapphire in a solid state (e.g., for high-pressure sodium (HPS) lamp or HPS light applications) may include heating PCA at high temperatures (e.g., above 1800° C.) under $H_2$.containing atmosphere. By evaporating self-contained magnesium oxide (MgO) or by adding other dopants, abnormal grain growth (AGG) may occur and grain boundaries having some mobilities may be nucleated and migrated, resulting in sapphire crystals. Such processes may allow manufacturing sapphire by converting pre-formed PCA, but these manufacturing processes may take multiple hours (e.g., more than 10 hours) to complete. Further, because the high heat may be applied to a large area of the PCA, multiple instances of AGG may occur. As a result, sapphire formed by these processes often consists of several large grains with small (e.g., 15-50 micrometers (μm)) unconverted grains trapped within the large grains.

In other examples, a heat source may be used for the solid state conversion of PCA (e.g., PCA tubes) to sapphire. Such techniques, however, may require pre-treatment of the PCA to reduce MgO content before processing (e.g., the PCA tube may require less than 100 parts per million by weight (ppmw) of MgO, and in some cases less than 50 ppmw of MgO, prior to processing). These pre-processing techniques used to reduce the MgO content (e.g., prior to the use of the localized heat source to manufacture the sapphire) increase manufacturing costs and likewise take an extended amount of time. For instance, the PCA tube conversion may require 10 hours of heat source processing to avoid thermal shock. In addition, these and other techniques for PCA conversion into sapphire may not be capable of controlling the location or direction of the conversion (e.g., controlling the thickness of the converted sapphire). Accordingly, improved techniques to reduce the time and cost for manufacturing sapphire and other crystalline materials having large grains may be desirable.

The new techniques and devices described herein may provide for efficient manufacturing of relatively large crystal materials, such as single crystal materials, from a ribbon or sheet of polycrystalline material (e.g., PCA). In particular, aspects of the present disclosure may include processing the ribbon or sheet to convert polycrystalline material into one or more grains of a large crystal material or a single crystal material (such as sapphire), which may be completed relatively quickly and with reduced manufacturing costs.

The described techniques may include concurrently heating the ribbon or sheet of polycrystalline material using multiple heat sources, where at least a portion of the ribbon or sheet may be in a general area heated by a first heat source (e.g., a flame, a furnace, an oven, a microwave) along with concurrent heating by a second heat source that may be more concentrated, localized, or focused (e.g., a laser, focused infrared (IR)) in a limited area within the general area. In some cases, the localized heat source may be scanned across the ribbon while the ribbon is heated by the first heat source. There may be relative motion between the ribbon and one or more of the heat sources (e.g., where the ribbon may move through a volume heated by the first heat source while a particular area of the ribbon is scanned by the localized heat source) in some examples. In any case, the concurrent heating by two or more different heat sources may initiate and drive grain growth and produce at least large grains on at least one surface of the processed ribbon/sheet.

In some examples, the described techniques may use a sintered (or at least partially sintered) solid state polycrystalline ribbon or sheet, or a solid state ribbon or sheet rolled from thicker material. The ribbon or sheet may have relatively smaller thickness (e.g., 40 μm) as compared to PCA tubes or other materials, and the ribbon or sheet may also not have restrictions on length or width. Further, the ribbon may be flexible and may allow for various manufacturing techniques, such as a roll-to-roll process. Further, there may not be any composition or content restrictions on the ribbon or sheet (such as the MgO content of the ribbon) prior to processing using the described techniques. For instance, a ribbon of polycrystalline material may include 500 ppmw of MgO, and the ribbon may not require pre-processing (e.g., heat treatment or other processes) to reduce the MgO content. Accordingly, the described techniques may advantageously reduce processing time and cost for manufacturing the large crystal material.

The described techniques may also convert the polycrystalline material of the ribbon or sheet at increased speeds, where the polycrystalline material may be converted at speeds of 0.2 inches per minute or more (e.g., 2 inches per minutes, 20 inches per minute, and so forth), thereby enabling the processing of a ribbon or sheet of polycrystalline material in significantly less time than other techniques (e.g., on the order of seconds and minutes instead of many hours). In some aspects, the conversion of the polycrystalline material into larger crystal material, such as sapphire, may generally be controlled such that the larger crystal material is manufactured from the surface of the ribbon or sheet (e.g., to a particular depth). In other cases, the conversion of the polycrystalline material into crystalline material having large grains (e.g., sapphire) may be achieved through the full thickness of the ribbon/sheet. The large grains of the processed material may be oriented in a first direction such that a basal plane (plane perpendicular to principal axis in crystal system) of the processed material may be aligned with a surface of the ribbon. In addition, the process may be a roll-to-roll process or a roll-to-sheet (e.g., singulated sheet) process.

After processing using the described techniques, the ribbon comprising the crystalline material having relatively large grains may be used in a variety of applications, including transparent scratch resistant phone covers, planar waveguides, laser crystals, creep resistant ceramics, creep resistant metals, substrates for electronics, substrates for superconductors, high temperature ceramic superconductors, ion conductors, and so forth. It is noted that, although some examples of the present disclosure are described with reference to converting alumina ceramics to large crystal materials (e.g., converting PCA to sapphire), the present disclosure is not limited to these materials. For example, the processing of the ribbon or sheet may not be limited to crystalline ceramics, but may also be used in crystalline metals, semiconductor materials, or other materials.

Features of the disclosure are initially described in the context of a device for manufacturing as described with reference to FIG. 1. Features of the disclosure are further described in the context of processing techniques, processed ribbons including crystalline materials, cross-sectional views of alumina ribbons, and flowcharts, as described with reference to FIGS. 2-6.

Figure 1:
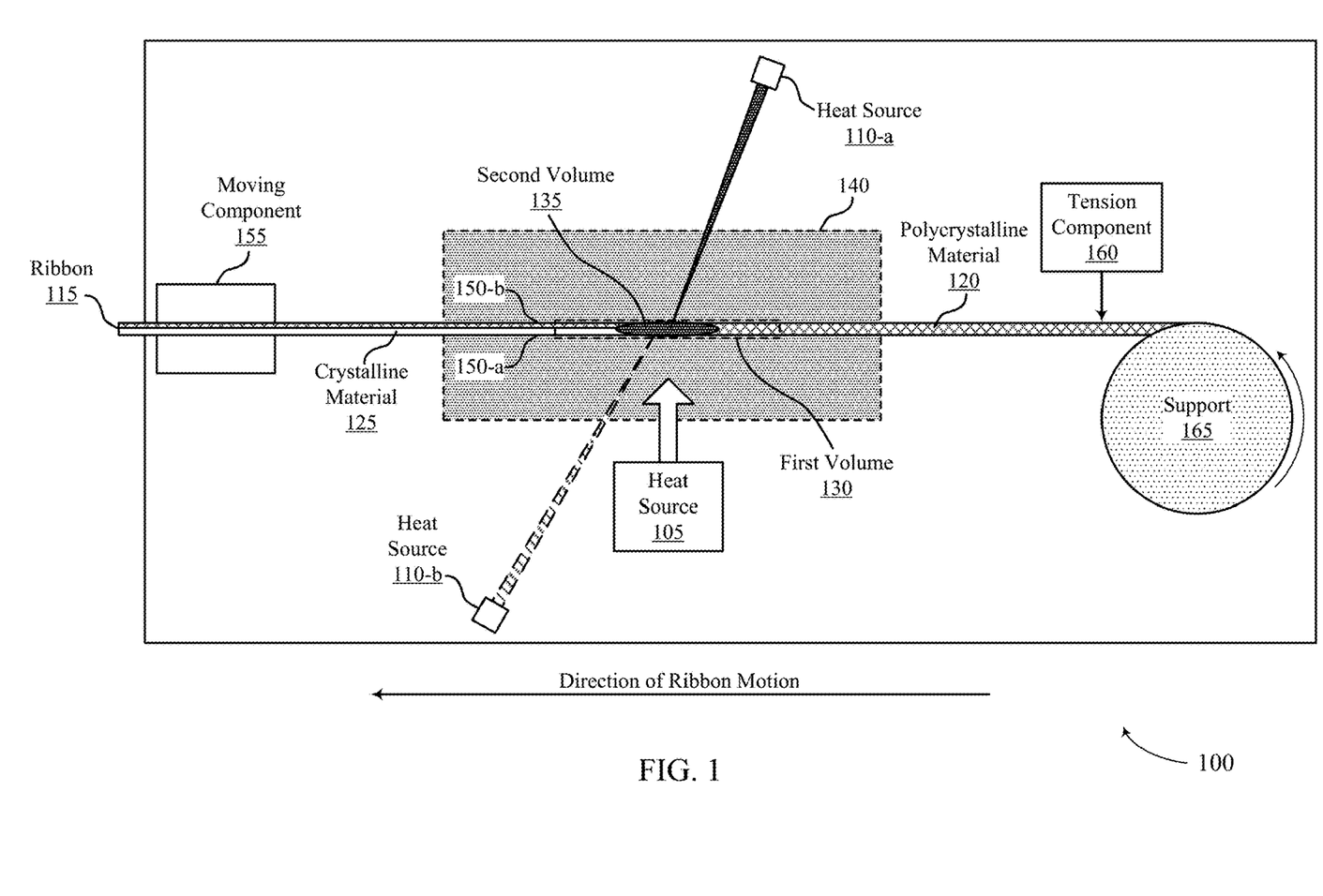
FIG. 1 illustrates an example of a device that supports the solid state conversion of polycrystalline material in accordance with examples as disclosed herein.

FIG. 1 illustrates an example of a device 100 that supports the solid state conversion of polycrystalline material in accordance with examples as disclosed herein. The device 100 may include a first heat source 105 and a second heat source 110, which may be used to apply heat to a ribbon 115 that includes a polycrystalline material 120 (e.g., PCA). The device 100 may be configured for processing the ribbon 115 to convert the polycrystalline material 120 of the ribbon 115 to a crystalline material 125 (e.g., a relatively larger grain crystal material, a single crystal material, a monocrystalline material, a sapphire material, or the like) having one or more grains that are larger than grains of the polycrystalline material 120. In some examples, the device may include a moving component 155, or a tension component 160, or a support component 165, or any combination thereof.

Processing the ribbon 115 by the device 100 may include applying energy (e.g., separately, concurrently, simultaneously) from multiple heat sources (e.g., the first heat source 105 and the second heat source 110) to the ribbon 115.

In some examples, the first heat source 105 may be an example of a heat source that facilitates heat transfer via convection or via radiation (e.g., a convection-type heat source, a radiation-type heat source), or both. For instance, the first heat source 105 may be an example of an oven, a flame, a torch, or a burner that applies heat to the ribbon 115, where the first heat source 105 may heat a first volume 130 of the ribbon 115. The first heat source 105 may also heat a volume 140 that is larger than the first volume 130 (e.g., including the atmosphere surrounding the ribbon 115), where the volume 140 may encompass (e.g., include) at least the first volume 130 of the ribbon 115. As an example, the first heat source 105 may be an example of a furnace, a microwave, an oven, or the like, that heats the first volume 130 of the ribbon 115. Accordingly, the first heat source 105 may heat the ribbon 115 through a thickness of the ribbon 115.

The first heat source 105 of the device 100 may be positioned at one or more various locations, orientations, or proximities relative to the ribbon 115. For instance, the first heat source 105 may be positioned opposite a first surface 150-a of the ribbon 115, such as when the first heat source 105 includes a flame or a burner. A distance between the first heat source 105 and the ribbon 115 may also be controlled or configured such that a temperature at which the first volume 130 is heated may be controlled, or modified, or both for processing the ribbon 115. Different orientations and placements of the first heat source 105 are possible. The first heat source 105 may be configured to control a temperature of at least the first volume 130 of the ribbon 115 (e.g., in response to, or to be able to compensate for, a configuration of the second heat source 110). Further, the first heat source 105 may include a filament or other component of a device that generates heat.

The second heat source 110 may be an example of a localized or concentrated heat source that heats a second volume 135 of the ribbon 115, for example, that may be within the first volume 130 of the ribbon 115. Because the first volume 130 may be heated by the first heat source 105, the second volume 135, which may be within the first volume 130, may be concurrently heated by the first heat source 105 and the second heat source 110. The concurrent application of heat from both the first heat source 105 and the second heat source 110 at the second volume 135 may drive grain growth within the second volume 135 and convert the polycrystalline material 120 to the crystalline material 125 having relatively large grains (e.g., a single crystal material).

The second heat source 110 may be an example of a radiation-type heat source, such as a laser, or focused IR, or the like. The second heat source 110 may be configured to apply heat to a concentrated area or location on a surface 150 of the ribbon 115 (e.g., and extending to a depth of the ribbon 115 to heat a volume of the ribbon 115) using one or more patterns or schemes. Additionally, the second heat source 110 may be configured to control a temperature of the ribbon 115 in the second volume 135 (e.g., based on accounting for or adjusting for a configuration of the first heat source 105). The second heat source 110 may be positioned at one or more various locations, orientations, and proximities relative to the ribbon 115. For instance, as illustrated by second heat source 110-a, the second heat source 110-a may be positioned opposite a second surface 150-b of the ribbon 115. Alternatively, the second heat source 110 may be positioned opposite the first surface 150-a of the ribbon 115, as illustrated by second heat source 110-b. The second heat source 110 (e.g., second heat source 110-a, second heat source 110-b) may apply heat to the ribbon (e.g., to the second volume 135 of the ribbon 115) from one or more various angles and directions relative to either the first surface 150-a or the second surface 150-b. In any case, the second heat source 110 may heat the second volume 135 of the ribbon 115 by irradiating the second volume 135. It is noted that other types of heat sources, and additional heat sources, are possible and contemplated, and the examples described herein are not to be considered limiting.

Heating the second volume 135 of the ribbon 115 may include scanning the second heat source 110 across the ribbon 115, where the scanning may be in accordance with a particular pattern. As an example, the second heat source 110 may be an example of a laser, and the laser may be scanned across the ribbon 115 using a raster pattern. Additionally or alternatively, the laser may form a wide beam (such as a light sheet or other configuration) which may continuously heat different portions of the second volume 135 as the wide beam is scanned across the ribbon 115. In some examples, the wide beam may be scanned across the ribbon 115 while the second volume 135 is concurrently heated by the first heat source 105. Thus, the second heat source 110 and the ribbon 115 may be moved relative to each other.

The described techniques for converting the material of the ribbon 115 may be transient, continuous, or stationary. For instance, the ribbon may be moved or translated in some direction by the moving component 155 of the device 100, where the moving component 155 may be configured to move the ribbon 115 (e.g., continuously, according to some movement configuration, or the like). Additionally or alternatively, the ribbon 115 may be stationary, and the device 100 and/or the heat sources may be continuously moved relative to the ribbon 115. In other examples, both the ribbon 115 and the device 100 may be moving with respect to each other. Further, the ribbon 115 may be moved by the moving component 155 relative to either the first heat source 105, the second heat source 110, or both. The moving component 155 may be an example of a motor alone or with one or more other components or other device capable of moving one or both of the ribbon 115 or the device 100, or the components thereof.

Moving the ribbon 115 relative to the device 100 (or one or more of the heat sources) while the second volume 135 of the ribbon 115 is concurrently heated by the heat sources may enable grain growth along the length of the ribbon 115, which may result in manufacturing alumina ribbons with relatively large grains fully covering at least one surface (e.g., fully covering a width of the ribbon).

In particular, the first volume 130 and the second volume 135 may dynamically change based on the motion of the ribbon 115. In some examples, the first volume 130 and the second volume 135 may advance along the length of the ribbon 115 as the ribbon 115 is moving (e.g., while the first heat source 105 is applied to the ribbon and while the second heat source 110 is applied to the ribbon 115). As such, the portion(s) of the ribbon concurrently heated by the first heat source 105 and by the second heat source 110 may result in the polycrystalline material 120 on at least the first surface 150-a (and to some related depth/volume of the ribbon) to be converted to the crystalline material 125 along the length of the ribbon 115.

Put another way, a portion of the ribbon 115 within the second volume 135 may be heated by the first heat source 105 and the second heat source 110, driving grain growth at that portion. As the ribbon 115 moves, the portion of the ribbon 115 that is subjected to both the first heat source 105 and the second heat source 110 may dynamically increase in the direction of the length of the ribbon 115 (e.g., a longitudinal direction of the ribbon), which may convert additional polycrystalline material 120 to the crystalline material 125 while the ribbon 115 moves. Additionally, and as described in further detail below, the crystalline material 125 may be manufactured in a lateral direction of the ribbon 115. In one example, the crystalline material 125 may, for example, increase in size outward from a center of the ribbon 115 towards the edges of the ribbon 115 as the ribbon is concurrently heated by the first heat source 105 and the second heat source 110.

The conversion of the polycrystalline material 120 to the crystalline material 125 having grains that are larger than grains of the polycrystalline material 120 may generally occur from a surface 150 of the ribbon 115 through a depth of the ribbon 115. For instance, and as described in further detail with reference to FIGS. 3B, 4A, and 4B, the polycrystalline material 120 may be converted in a volume of the ribbon 115 that extends from the first surface 150-$a$ to a first depth. In some cases, the conversion to the crystalline material 125 may occur on a same surface 150 to which the first heat source 105 is applied (e.g., the first surface 150-$a$ of the ribbon 115), such as in the case where the first heat source 105 is a flame, torch, or burner. In other examples, conversion to the crystalline material 125 on a surface 150$a$ may be irrespective of the location, position, or orientation of one or both of the first heat source 105 or the second heat source 110. As a result, the processed ribbon 115 may include both a portion or volume of polycrystalline material 120 (e.g., through a depth of the ribbon 115 from the second surface 150-$b$) and another portion or volume of crystalline material 125 having relatively large grains (e.g., through a depth of the ribbon 115 from the first surface 150-$a$).

As an illustrative example of the conversion process performed by the device 100, among others, a laser or other concentrated, localized heat source may be used in addition to a another heating source to convert a polycrystalline alumina ribbon to produce an alumina ribbon with relatively large grains covering one surface 150. A propane torch flame (e.g., the first heat source 105) may be used to heat alumina ribbons from one side (e.g., corresponding to the first surface 150-$a$) and a carbon dioxide ($CO_2$) laser (e.g., the second heat source 110) may be used to scan across the alumina ribbon at generally the same area or location from the other side (e.g., corresponding to the surface 150-$b$). That is, the alumina ribbon alumina ribbon may travel though an area heated by the propane torch flame with the $CO_2$ laser scanning the alumina ribbon. The temperature of the alumina ribbon may be controlled by both the first heat source 105 (e.g., the flame) and the second heat source 110 (the $CO_2$ laser).

In this example, the starting materials of the ribbon 115 (e.g., prior to processing using device 100) may include a fully sintered (or at least partially sintered) alumina ribbon (e.g., comprising $Al_2O_3$). In some cases, the alumina ribbon may have 99.95 percent purity and a uniform polycrystalline microstructure. In some cases, the alumina ribbon may have greater than 99 percent relative density and the polycrystalline material 120 of the ribbon 115 may have a 1.5 µm grain size. In some example, the alumina ribbon may be 500 ppm MgO by weight. The alumina ribbon may be processed with this or a different content of MgO by weight, and the alumina ribbon may not require pre-treatment to reduce or modify the MgO content. The ribbon 115 may also exclude dopants, such as silicon dioxide ($SiO_2$), for example, on the surface of the ribbon 115.

The ribbon 115 may be an example of an alumina ribbon ceramic, a flexible ceramic ribbon, or the like. For example, the ribbon 115 of the present example may be an alumina ribbon 40 µm thick, and may be 1 inch wide, and 4 inches long. However, other ribbon dimensions are considered. For example, the alumina ribbon may be wider than 1cm, (e.g., 2.5 cm wide, or may be wider than 10 cm, or wider than 30 cm). Likewise, the alumina ribbon may be longer than 1cm (e.g., 5 cm, 10 cm, but may be as long as an area may allow). Further, while the alumina ribbon may be 40 µm thick, it may be any thickness (e.g., between 20 and 1000 µm). It is also noted that although aspects of the present disclosure are described with reference to the ribbon 115, a sheet (e.g., an alumina sheet) or other similar structure may be used.

The laser beam (e.g., of the second heat source 110) may, for example, have a diameter of 8 mm and a power of 88 watts (W). However, a laser having different power and diameter may be used. In one example, the laser may be rastered across the alumina ribbon at a speed of 4500 mm/s with a scanning width of 60 mm. In another example, the laser may be continuously scanned across the width of the ribbon at a speed of 4500 mm/s (e.g., instead of rastering). At the end of scan, the laser beam may be stepped by 0.025 mm. In some examples, the effective laser movement speed along the length of the alumina ribbon may be 1.8 mm/s, but different speed may be possible. In some cases, the laser may scan a ribbon length of 1.5 inch in less than 30 seconds. The speed of the process performed by device 100 for converting the polycrystalline material 120 to the crystalline material 125 may be 0.2 inches per minute, or more. For instance, the ribbon may be moved at a speed of 2 inches per minute, 20 inches per minute, or 200 inches per minute. As such, the alumina ribbon may be processed with enhanced speed, as compared to other processes that take multiple hours.

When the alumina ribbon passes through the propane flame torch and the $CO_2$ laser (e.g., the second volume 135 being concurrent heated by the first heat source 105 and the second heat source 110), large grains fully covering the first surface 150-$a$ of the alumina ribbon may be achieved. Thus, the processed ribbon 115 may include at least a portion of crystalline material 125 that includes one or more grains (e.g., large grains) that are larger than grains of the polycrystalline material 120. The concurrent application of the heat sources may result in converting the polycrystalline material 120 to single crystal material (e.g., sapphire). In some cases, a lateral size of the large grains may be larger than 500 µm. In some examples, the lateral size of the large grains may be as large as the lateral size of the ribbon. In some examples, the size of the large grains in depth may be larger than 10 µm and may be as deep as the thickness of the ribbon. As such, the processed ribbon may be a single crystal sapphire ribbon throughout.

In some examples, tension may be used (e.g., during or after) the process to convert polycrystalline alumina ribbons to alumina ribbons with relatively large grains fully covering one surface 150, where the tension may modify or change the shape of the converted alumina ribbons. Here, the tension component 160 may apply tension to one or more locations of the ribbon 115. As an illustrative example, tension may be controlled by applying a weight on one end of the ribbon 115 while the other end is being pulled by the moving component 155 (e.g., a motor) at a steady speed when the alumina ribbon passes through the first heat source 105 (e.g., a propane flame torch) and the second heat source 110 (e.g., a laser). In one example, the tension component 160 may apply a weight of 200 grams to the ribbon 115 while the ribbon 115 may be pulled by the moving component 155 at a speed of 2 inches per minute. The tension component 160 may apply tension to the ribbon 115 at the same time the ribbon 115 (e.g., the second volume 135) is being simultaneously heated by the first heat source 105 and the second heat source 110. In other examples, the tension component 160 may apply tension after the ribbon 115 is simultaneously heated by the first heat source 105 and the second heat source 110.

In some examples, the ribbon 115 may be processed multiple times, which may increase the amount of crystalline material (e.g., single crystal material) of the processed ribbon 115. For instance, after the ribbon 115 is processed by device 100, resulting in a ribbon having the relatively large crystal material (e.g., crystalline material 125) along the length of the ribbon 115, one or more heat sources, such as the first heat source 105 or the second heat source 110 or both, may be used for applying heat to the ribbon 115, for example, a second time. In such cases, the additional processing of the ribbon 115 may result in a greater amount of crystalline material 125 having large grains being formed along the length of the ribbon 115 (e.g., an increased depth of sapphire material from the first surface 150-*a*).

More specifically, additional processing by applying the first heat source 105 or the second heat source 110 (e.g., to the second volume 135) or both, may result in some portion or subset of polycrystalline material 120 (e.g., that remains after initial processing of the ribbon 115) to be converted to the crystalline material 125. As described with reference to FIGS. 4A and 4B, a depth of the crystalline material 125 may increase as a result of additional processing the ribbon multiple times (e.g., sequentially). The ribbon 115 may be processed any number of times, which in some cases may result in manufacturing a ribbon 115 of the crystalline material 125 (e.g., containing no or trace amounts of the polycrystalline material 120). In some examples, the second volume 135 of the ribbon 115 may be concurrently heated by the first heat source 105 or the second heat source 110 or both multiple times (e.g., additional scans by the second heat source 110). Additionally or alternatively, the second volume 135 of the ribbon 115 may be concurrently heated by a third heat source (e.g., similar to the first heat source 105) and a fourth heat source (e.g., similar to the second heat source 110). In some cases, the first heat source 105, the second heat source 110, the third heat source, and the fourth heat source may be the same or different types of heat sources. Additionally or alternatively, the ribbon 115 may be processed in a different direction or orientation from an initial processing. For instance, the ribbon 115 may be processed once, then flipped over and processed again.

The support component 165 of the device 100 may hold the ribbon 115, for example, prior to processing. The support component 165 may be an example of a spool or similar device that holds the ribbon 115 prior to processing and potentially provides some rigidity for processing. Additionally or alternatively, the processing of the ribbon 115 may be a roll-to-roll process, and a second support component may be used to hold the ribbon 115 after the ribbon 115 is processed. In other cases, the processed ribbon 115 may be singulated into two or more portions of crystalline material 125 having large grains.

One or more aspects performed by device 100 may result in alumina ribbons 115 with large grains fully covering at least one surface 150. The processed ribbons 115 may have a shape or form factor that allows for various applications and uses, and the alumina ribbons produced by device 100 may be rolled. The described manufacturing techniques and the device 100 may provide for increased speed and reduced manufacturing costs, among other benefits. For example, alumina ribbons (or sheets of alumina or PCA) converted to relatively large grain crystal materials, such as sapphire, may improve many properties of the alumina, such as scratch resistance, thermal conductivity, optical transmittance, etc. In addition, the conversion of the alumina ribbons may be performed while the ribbon is in a solid state (e.g., without melting of the ribbon 115).

The described manufacturing techniques may result in long single crystal ribbons or sheets of various compositions. The described techniques may also make large size, thin alumina ribbons with large grains fully covering at least one surface. Such a form factor, together with the superior properties of large crystal materials and single crystal materials described herein, is unique in the thin ceramic substrate industry. As such, the processed ribbon 115 described herein may provide one or more advantages in a variety of commercial applications, such as substrates for electronics, covers for electronics (e.g., phones, watches), insulators, etc. Further, the described techniques may lower manufacturing costs and also may not require high temperature furnaces and/or controlled atmosphere. The process may be continuous with a speed of at least 0.2 inches per minute, and the potential roll-to-roll process may further lower manufacturing costs. In some cases, the described process and apparatus may make thin, single crystal ribbons and/or sheets with increased length (e.g., multiple meters in length).

Figure 2:
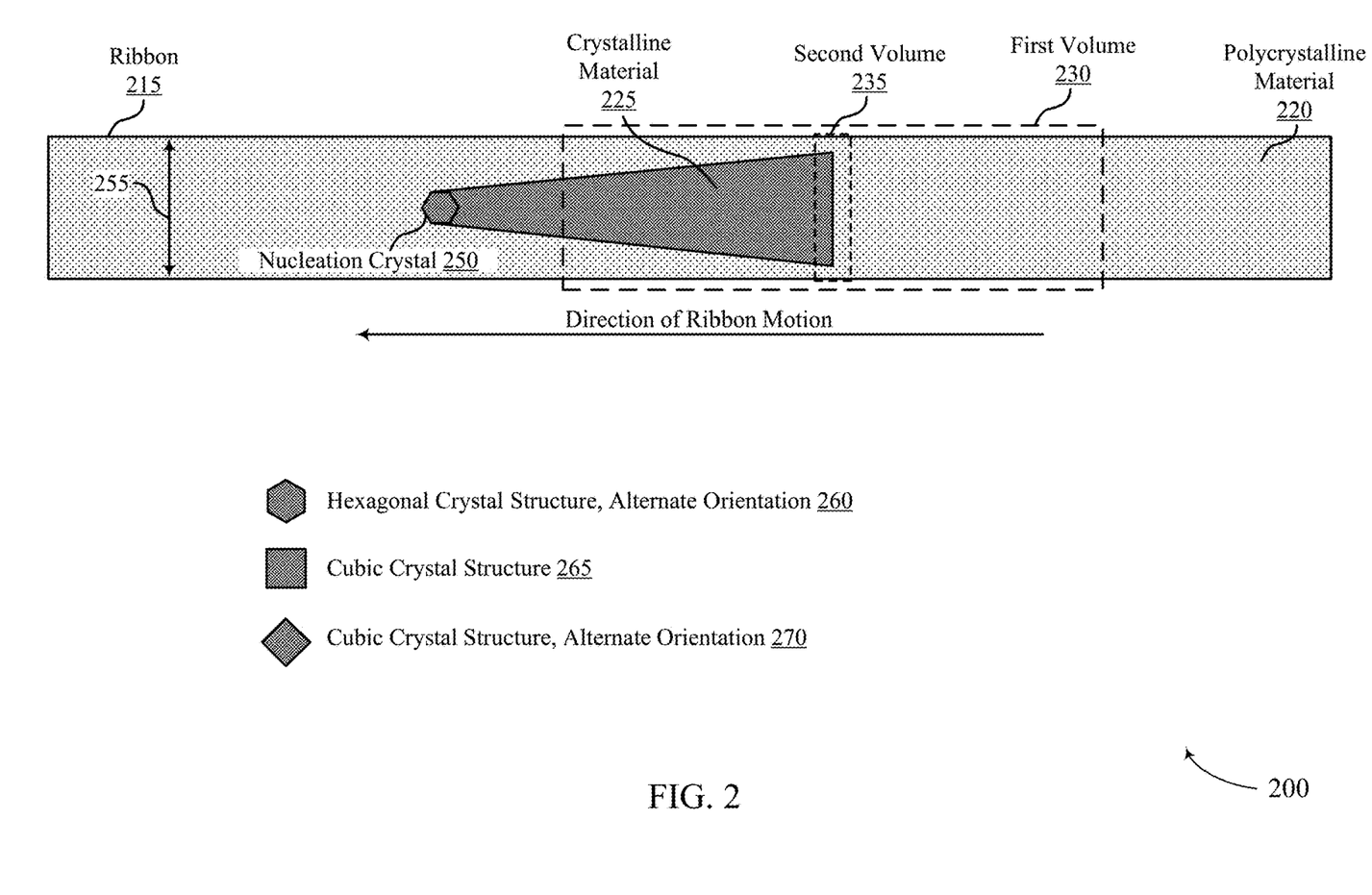
FIG. 2 illustrates an example of a manufacturing scheme that supports the solid state conversion of polycrystalline material in accordance with examples as disclosed herein.

FIG. 2 illustrates an example of a manufacturing scheme 200 that supports the solid state conversion of polycrystalline material in accordance with examples as disclosed herein. The manufacturing scheme 200 may be implemented by a device, such as the device 100 described with reference to FIG. 1. For example, the manufacturing scheme may include a ribbon 215 (e.g., an alumina ribbon) that comprises polycrystalline material 220, which may be an example of the ribbon 115 described with reference to FIG. 1.

The manufacturing scheme 200 may be used to process the ribbon using a first heat source (e.g., a flame, a torch, a furnace, an oven) that may heat a first volume 230 of the ribbon 215 and using a second heat source that concurrently heats a second volume 235 of the ribbon 215 within the first volume 230. The concurrent heating of at least the second volume 235 of the ribbon 215 may convert the polycrystalline material 220 to crystalline material 225 that has one or more grains that are larger than the grains of the polycrystalline material 220. In some examples, the crystalline material 225 may be a single crystal material. In some cases, the crystalline material 225 may be a sapphire material.

The manufacturing scheme 200 may include the use of a nucleation crystal 250 (e.g., a seed crystal) deposited on the ribbon 215, where one or more different orientations of the crystalline material 225 may be obtained by utilizing the nucleation crystal 250. Through the use of the manufacturing scheme 200, an alumina ribbon with large grains covering at least one surface of the ribbon 215 may be manufactured.

As described herein, the application of multiple heat sources to the ribbon 215 may drive grain growth of a relatively large crystal material (e.g., the crystalline material 225) on a surface of the ribbon 215 to a depth of the ribbon 215.

The relatively large crystal material may have a particular orientation on the ribbon 215. For example, one or more grains of the relatively large crystal material may have an orientation such that a basal plane of the large crystal material is aligned or nearly aligned with a plane or surface of the ribbon 215. In some cases, a nucleation crystal 250 may be used to initiate grain growth for the ribbon 215. For instance, the nucleation crystal 250 may be deposited on the ribbon 215 and when the volume of the ribbon 215 including the nucleation crystal 250 is within the second volume 235 (e.g., being concurrently heated by multiple heat sources), the nucleation crystal 250 may initiate grain growth of the crystalline material 225 having large grains. In other embodiments the crystals may be otherwise aligned and/or the system may not include a basal plane.

Further, as illustrated by manufacturing scheme 200, the growth of the crystalline material 225 may be initiated from or near a location of the nucleation crystal 250. The grain growth may then spread to the edges of the ribbon 215 as the ribbon 215 moves in relation to the heat sources (alternatively, as the heat sources move in relation to the ribbon). Specifically, the crystalline material 225 may increase in size in a lateral dimension of the ribbon 215 as well as a longitudinal direction (corresponding to a length of the ribbon 215) as successive portions of the ribbon 215 are dynamically located within the second volume 235 being concurrently heated. In some examples, the crystalline material 225 having large grains may cover a surface of the ribbon 215 and may have a width that is the same as a width 255 of the ribbon 215.

Some compositions and orientations of the crystalline material 225 may be controlled or enhanced via the use of the nucleation crystal 250 (e.g., through forced nucleation by the seed crystal), and different crystalline shapes or structures may be used for the nucleation crystal 250. As an illustrative example, the nucleation crystal 250 may have a hexagonal crystal orientation. In other examples, an alternate hexagonal orientation 260 may be used for the nucleation crystal 250. Additionally or alternatively, a cubic crystal orientation 265 may be used for the nucleation crystal 250. In some cases, an alternate cubic orientation 270 may be used for the nucleation crystal 250. Other shapes, sizes, and orientations of the nucleation crystal 250 may be used, and the examples described should not be considered to be limiting. The shape, orientation, or structure of the nucleation crystal 250 may modify the orientation of the formed crystalline material 225 on the surface and in the volume of the ribbon 215.

Figure 3A:
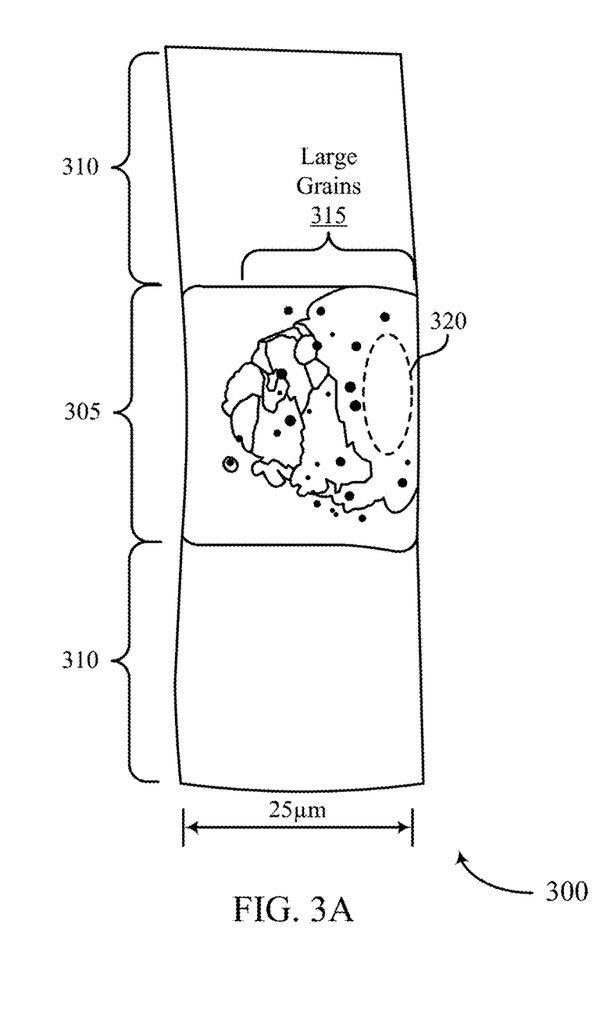
FIGS. 3A and 3B illustrate examples of a ribbon related to the solid state conversion of polycrystalline material in accordance with examples as disclosed herein.
Figure 3B:
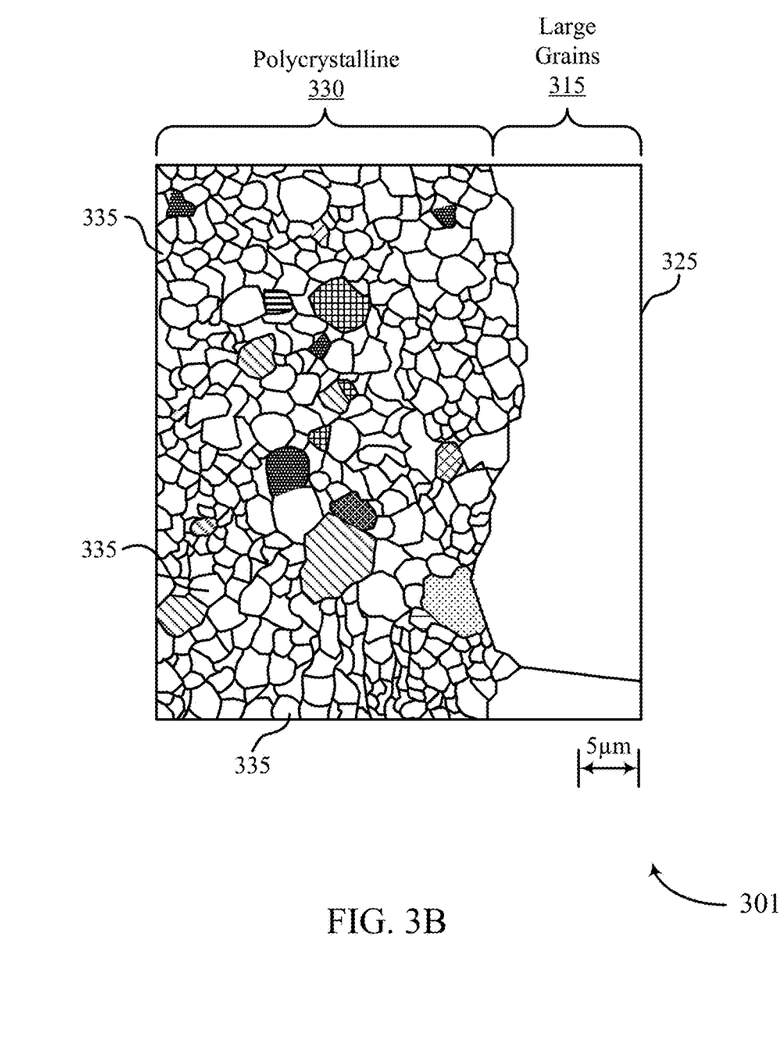

FIGS. 3A and 3B illustrate examples of a ribbon 300 that relates to solid state conversion of polycrystalline materials.

For example, FIG. 3A may illustrate a surface of a ribbon 300 that has been processed using the techniques described herein. More specifically, the ribbon 300 may illustrate an example of an alumina ribbon, such as a ribbon 115 or a ribbon 215 described with reference to FIGS. 1 and 2, processed by concurrently heating the ribbon 300 using a first heat source (e.g., a flame, an oven) and a second heat source (e.g., a laser). In some examples, the ribbon 300 may comprise other materials, such as crystalline metals, semiconductor materials, or other ceramic materials.

The surface of the ribbon 300 may accordingly include a relatively large crystal material as a result of the concurrent heating. In particular, the ribbon 300 may include a relatively large crystal material or single crystal material on its surface. A processed area 305 of the ribbon 300 that at least the second heat source (e.g., a laser, focused IR, or other radiation-type heat source) was applied may have a higher translucency than an un-processed area 310 of the ribbon 300. The processed area 305 (e.g., a lasered area) may accordingly include one or more large grains 315 that have formed on the surface of the ribbon 300. Further, within the processed area 305, there may be a region 320 with even higher translucency. In some examples, the size of the region 320 may be similar to the size of the region where the ribbon 300 was heated by the first heat source, such as in the example where a flame or a torch was used as the first heat source, as described herein.

FIG. 3B may illustrate an example of a cross section 301 of the ribbon 300. For example, the cross section 301 of the processed ribbon 300 may illustrate one or more portions of the region 320 described with reference to FIG. 3A. As described herein, the large grains 315 may be on a surface 325 of the ribbon 300. The large grains 315 may correspond to a volume of the ribbon 300 beginning at the surface 325 of the ribbon 300 and extending to a depth of the ribbon 300. For example, the depth of the large grains 315 from the surface 325 may be at least 10 µm. In some examples, the large grains 315 may have a dimension that is at least hundreds of microns long (e.g., laterally along the surface 325 of the ribbon 300), and may also extend longitudinally (e.g., corresponding to a length of the ribbon 300) for hundreds of microns. However, the volume of the large grains 315 may have different dimensions in one or more directions.

The cross section 301 also illustrates a polycrystalline material 330 of the ribbon 300 having multiple grains 335, where the one or more large grains 315 (e.g., of a crystalline material) may be larger than the grains 335 of the polycrystalline material 330. The grains 335 may be of varying size and may have a different orientation (e.g., a random orientation) with respect to each other. By contrast, a large grain 315 may have a same orientation as another large grain 315, or may have an orientation that corresponds to a hexagonal or triclinic crystal structure. In some examples, a large grain 315 may be an example of a single crystal material. The single crystal material may not have a grain boundary (e.g., other than the surface 325) and may extend across the width of the ribbon. Further, in some examples, the single crystal material may have an atomic structure that repeats periodically across the volume of the large grain 315.

In some examples, concurrent heating using multiple heat sources (e.g., laser processing and the additional flame heating) of the ribbon 300 may result in different microstructures when processed under different conditions. For instance, an original microstructure of the ribbon 300 may have some porosity after sintering. In the microstructure illustrated by cross section 301 (e.g., after having heat applied simultaneously by two different heat sources), a large crystal (e.g., the large grains 315) may be formed. In some aspects, the grains 335 of the polycrystalline material 330 be larger than an original size of polycrystalline grains in volume of the un-processed ribbon (e.g., corresponding to the un-processed area 310).

In some cases, by applying the same laser processing on the alumina ribbon 300 without the first heat source (e.g., only applying heat using the second heat source), the microstructure of the ribbon 300 may became denser without much grain growth. Alternatively, by applying a high power laser (e.g., as the second heat source) for processing on the alumina ribbon 300 and without the first heat source, some grains may grow to a size slightly larger than the grains 335 of the polycrystalline material 330. Such grain growth may be a result of a higher temperature achieved by way of the increased power of the laser. In some cases, no large crystals may be present through laser processing only, where the addition of the concurrent heat from the first heat source (e.g., a flame, an oven, etc.) may result in the formation of the large crystals, even in cases where no change was observed by heating using the first heat source only.

In some examples, a large grain 315 may be oriented with a basal plane (0001, or 001) of the crystalline material (e.g., a sapphire crystal) aligned in the plane of the ribbon 300. The opposite side of the ribbon 300 may have small grain size polycrystals (e.g., polycrystalline material 330; less than 100 µm average grain size on the surface, such as less than 80 µm, such as less than 50 µm, such as less than 20 µm, such as less than 10 µm, such as on the order of 5 µm or less average grain size on the surface of the opposite size of the ribbon 300), which may correspond to an unoriented polycrystalline alpha-alumina. By contrast, the grain size of the crystalline material may be at least µm on average, as measured on a surface of the ribbon 300, such as at least 150 µm average grain size, such as at least 200 µm, at least 500 µm. In some embodiments, a lateral dimension of the grain size of one or more grains of the crystalline material may be at least 1 millimeter and a longitudinal dimension of the grain size is at least 1 millimeter. Support of sintered, smaller grain size portion of the ribbon 300 may hold the ribbon 300 together as the heat sources soften and allow formation of the larger grain size portion of the ribbon 300.

Figure 4A:
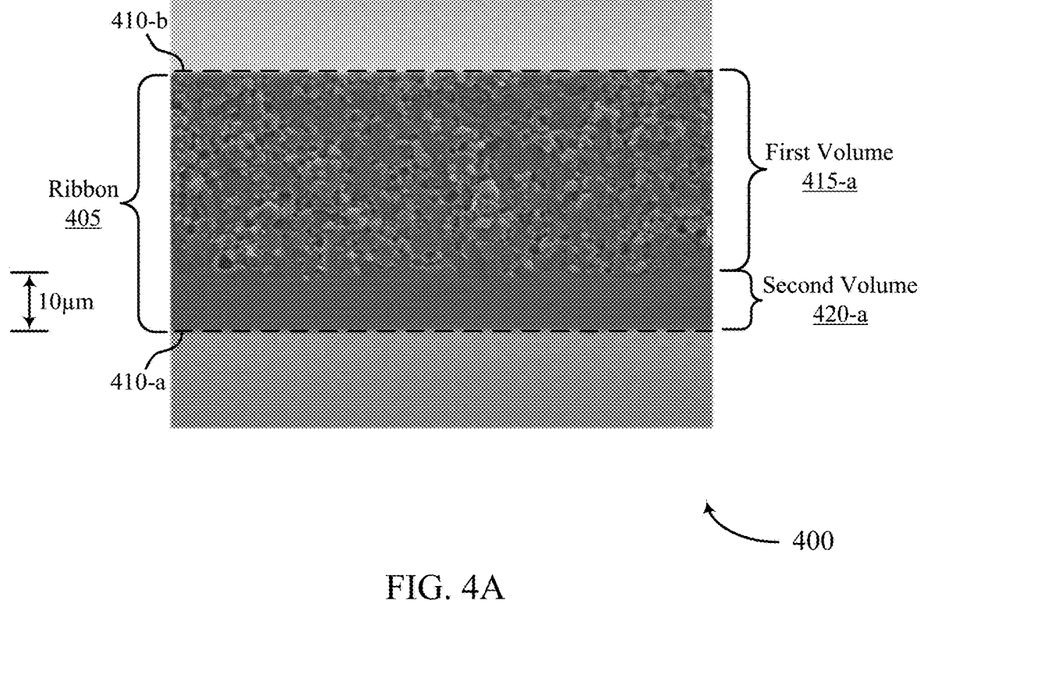
FIGS. 4A and 4B illustrate cross sections of a ribbon related to the solid state conversion of polycrystalline material in accordance with examples as disclosed herein.
Figure 4B:
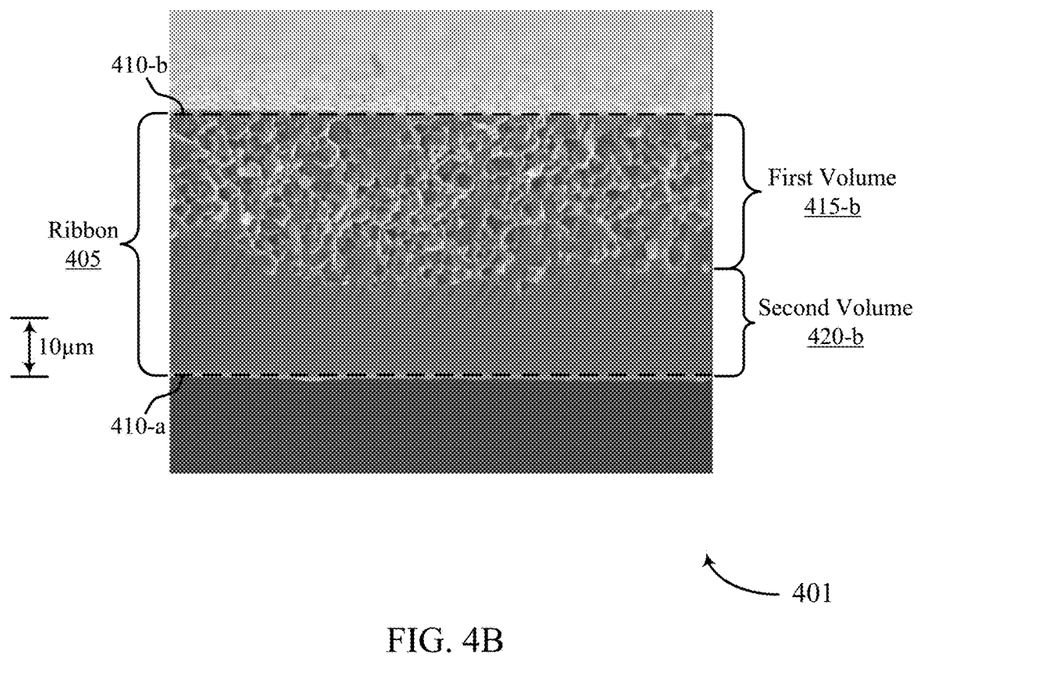

FIGS. 4A and 4B illustrate examples of cross sections 400 and 401 of a processed ribbon that relates to the solid state conversion of polycrystalline material in accordance with examples as disclosed herein. The cross sections 400 and 401 illustrate an alumina ribbon 405 that has been processed one or more times according to the techniques described herein. The ribbon 405 may be an example of an alumina ribbon (e.g., PCA, alumina ribbon ceramic), such as a ribbon 115, a ribbon 215, or a ribbon 300 described with reference to FIG. 1, 2, 3A, or 3B, that has been processed by concurrently heating the ribbon using a first heat source and a second heat source. In some examples, the ribbon may be processed by a manufacturing device, such as device 100, as described with reference to FIG. 1.

In some examples, the alumina ribbon 405 may be scanned by a localized heat source (e.g., a laser) multiple times while being concurrently heated using another heat source (e.g., a furnace, a flame, etc.). In particular, FIG. 4A illustrates a cross section of an alumina ribbon 405 that has been processed once using the described techniques (e.g., by a CO2 laser with a propane torch flame). At least a portion the ribbon 405 may have been heated using a first heat source and a second, different heat source resulting in large grains fully covering at least one surface 410 (e.g., surface 410-*a*) of the ribbon 405.

The processed ribbon 405 may include a first volume 415-*a* comprising polycrystalline material and a second volume 420-*a* comprising crystalline material having one or more grains that are larger than grains of the polycrystalline material. The first volume 415-*a* may extend from a surface 410-*b* to a first depth of the ribbon 405. Similarly, the second volume 420-*a* may extend from the surface 410-*a* to a second depth of the ribbon 405. Based on the processing of the ribbon 405 using the concurrent heat sources, the depth of the second volume 420-*a* (e.g., comprising large crystal material) may be at least 1 µm. However, as illustrated, second volume 420-*a* may be at least 10 µm deep. In other cases, the depth of the second volume 420-*a* (e.g., after being processed once) may be the same as or about the same as a thickness of the ribbon 405 (where the depth of the first volume 415-*a* of polycrystalline material may be zero or near zero).

The ribbon 405 may be processed one or more additional times, and FIG. 4B illustrates an example of an alumina ribbon (e.g., ribbon 405) that has been scanned, for example, four times (e.g., by a CO2 laser while concurrently heated with a propane torch flame). As a result of the additional heat processing, the thickness of the large grains included in the second volume 420-*a* of the ribbon 405 may increase in size. Specifically, after being processed one or more additional times, at least first subset of polycrystalline material from the first volume 415-*a* may be converted into large crystal material (e.g., crystalline material). Accordingly, the crystalline material of the second volume 420-*a* may increase in size (e.g., depth).

As a result of the additional processing, and as illustrated by the cross section 401, the first volume 415-*b* may be less than the first volume 415-*a* and the second volume 420-*b* may be greater than the second volume 420-*a*. Here, the depth of the second volume 420-*b* may be greater than the depth of the second volume 420-*a*, where the depth of the second volume 420-*b* may, for example, be between 15 µm and 20 µm. In some cases, the depth of the second volume 420-*b* (e.g., after one or more additional processing operations) may be the same as or nearly the same as the thickness of the ribbon 405 (where the depth of the first volume 415-*b* of polycrystalline material may be zero or near zero). The increase in the depth of the second volume 420-*b* including the large crystal material may follow a transitional parabolic law of grain growth.

Figure 5:
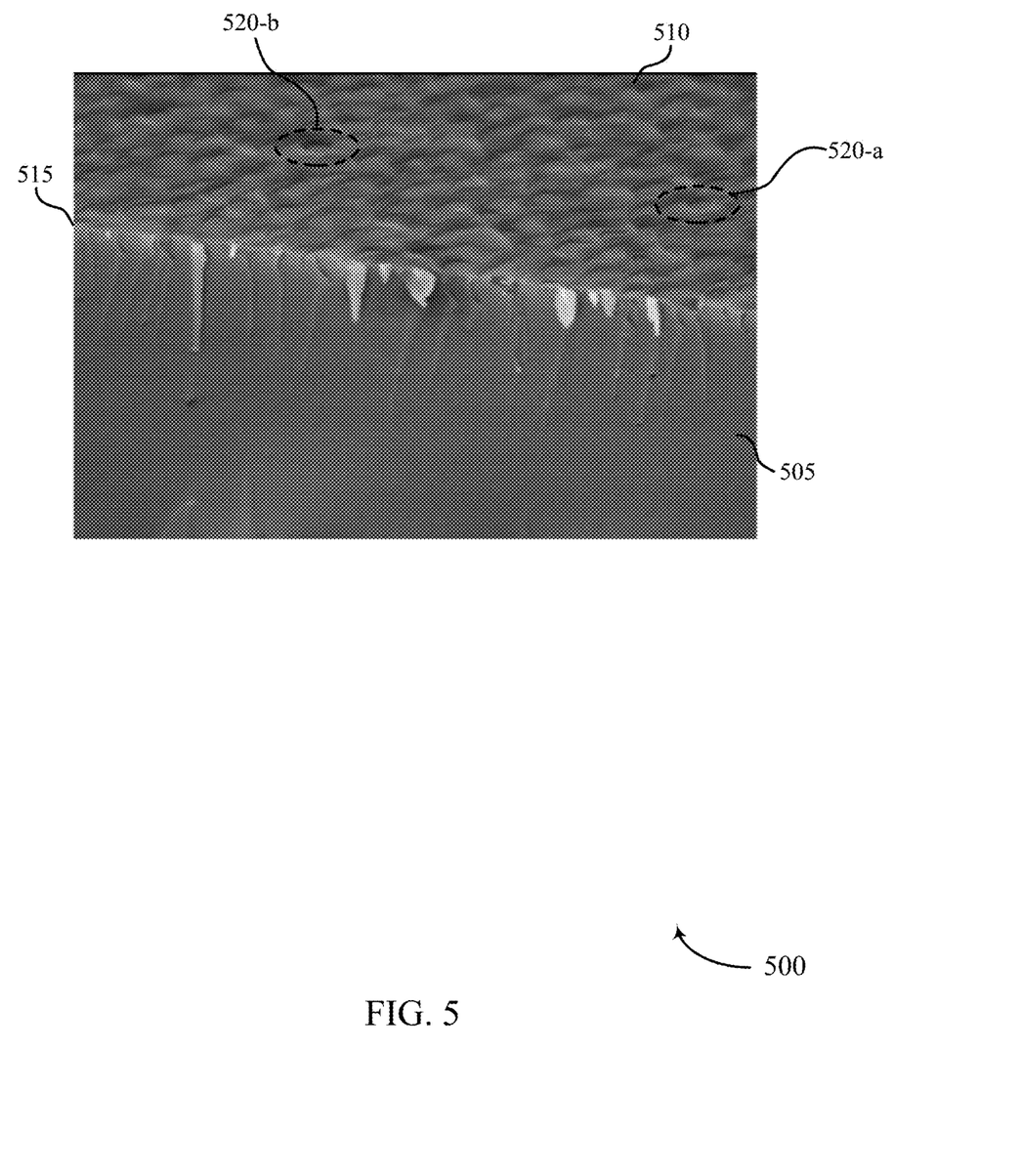
FIG. 5 illustrates an example of a cross section of a ribbon related to the solid state conversion of polycrystalline material in accordance with examples as disclosed herein.

FIG. 5 illustrates an example of cross section of a ribbon 500 that relates to the solid state conversion of polycrystalline material in accordance with examples as disclosed herein. The cross section of the ribbon may be an example of an alumina ribbon (e.g., PCA, alumina ribbon ceramic), such as a ribbon 115, a ribbon 215, a ribbon 300, or a ribbon 405 described with reference to FIG. 1, 2, 3A, 3B, 4A, or 4B that has been processed by concurrent heating using a first heat source and a second heat source.

The cross section of the ribbon 500 may illustrate a large crystal 505 which has been formed after processing using the described techniques. Additionally, the cross section of the ribbon 500 illustrates a surface 510 of the large crystal 505 and an edge 515 (e.g., a corner) of the large crystal 505. The surface 510 may correspond to a flat surface of the alumina ribbon 500. As shown on the surface 510, multiple rounded hexagonal terraces 520 (e.g., hexagonal terraces 520-*a* and 520-*b*) of the large crystal 505 may be present. These hexagonal terraces 520-*a* and 520-*b* illustrate that a basal plane orientation of the large crystal 505 may be aligned with a plane of the alumina ribbon 500. In addition, the surface 510 of the large crystal 505 may illustrate multiple partially rounded hexagons.

Here, the ledges and terraces of the large crystal 505 may provide surface diffusion that minimizes a surface energy. The hexagonal terraces 520 (as well as the partial rounded hexagons) may reflect an underlying crystal structure of the large crystal 505 (hexagonal/triclinic) and show that a basal plane may be nearly in the plane of the alumina ribbon 500. Such an orientation may be advantageous, for example, if the structure is to be used for optical purposes where light is transmitted normal to the plane of the ribbon (e.g., for phone or tablet touch screens). As described herein, other orientations of the large crystal 505 may be achieved through the described techniques.

Figure 6:
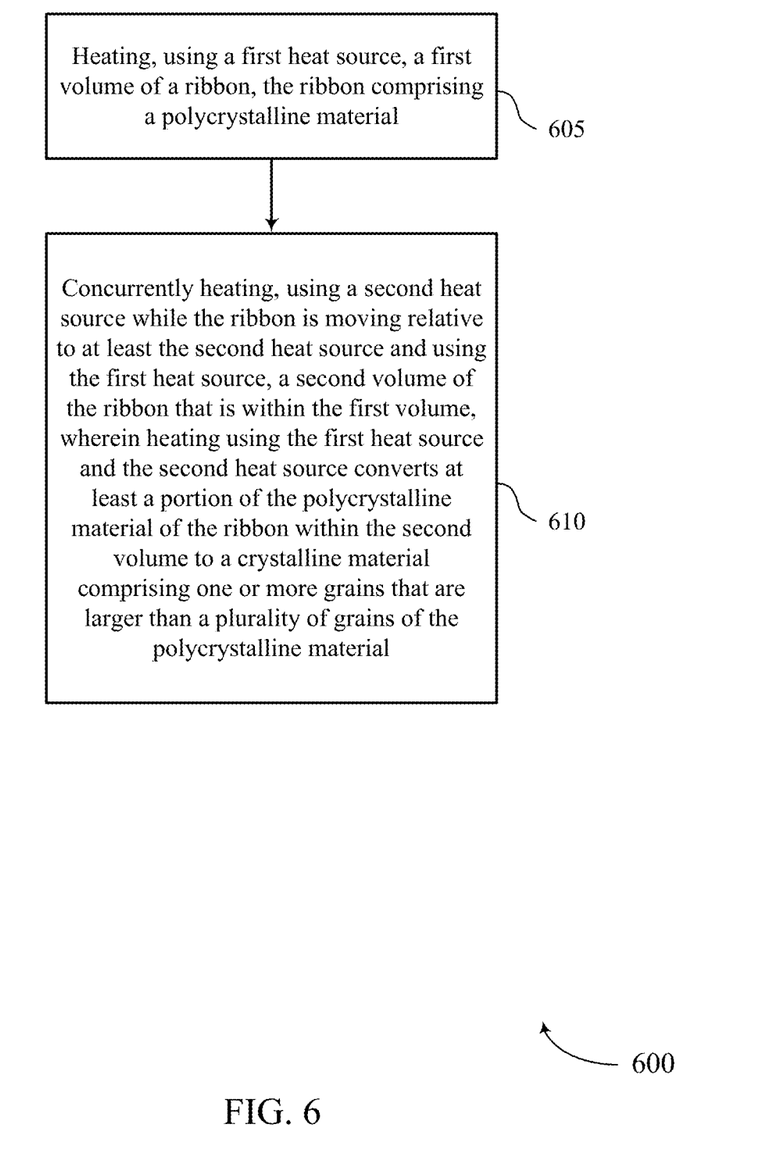
FIG. 6 shows a flowchart illustrating a method that supports the solid state conversion of polycrystalline material in accordance with examples as disclosed herein.

FIG. 6 shows a flowchart illustrating a method 600 that supports solid state conversion of polycrystalline material in accordance with examples as disclosed herein. The operations of method 600 may be implemented by a manufacturing system or one or more controllers associated with a manufacturing system. In some example, the operations of method 600 may be implemented by a device, such as a device 100 described with reference to FIG. 1, among other examples. In some examples, one or more controllers may execute a set of instructions to control one or more functional elements of the manufacturing system or device to perform the described functions. Additionally or alternatively, one or more controllers may perform aspects of the described functions using special-purpose hardware.

At 605, the method 600 may include heating, using a first heat source, a first volume of a ribbon, the ribbon including a polycrystalline material. The operations of 605 may be performed according to the methods described herein. The operations of 605 may be performed by a device, such as a device 100 or 200 described with reference to FIGS. 1 and 2.

At 610, the method 600 may include concurrently heating, using a second heat source while the ribbon is moving relative to at least the second heat source and using the first heat source, a second volume of the ribbon that is within the first volume, where heating using the first heat source and the second heat source converts at least a portion of the polycrystalline material of the ribbon within the second volume to a crystalline material including one or more grains that are larger than a plurality of grains of the polycrystalline material. The operations of 610 may be performed according to the methods described herein.

In some examples, an apparatus as described herein may perform a method or methods for manufacturing, such as the method 600. The apparatus may include features, means, or instructions (e.g., a non-transitory computer-readable medium storing instructions executable by a processor) for heating, using a first heat source, a first volume of a ribbon, the ribbon including a polycrystalline material. The apparatus may include features, means, or instructions for concurrently heating, using a second heat source while the ribbon is moving relative to at least the second heat source and using the first heat source, a second volume of the ribbon that is within the first volume, where heating using the first heat source and the second heat source converts at least a portion of the polycrystalline material of the ribbon within the second volume to a crystalline material including one or more grains that are larger than a plurality of grains of the polycrystalline material.

In some examples of the method 600 and the apparatus described herein, the operations, features, means, or instructions for concurrently heating the second volume using the second heat source may further include operations, features, means, or instructions for heating at least a first surface of the ribbon using the first heat source, where heating at least the first surface of the ribbon heats the first volume of the ribbon, and concurrently heating a second surface of the ribbon different from the first surface, where the polycrystalline material may be converted to the crystalline material from the first surface of the ribbon and extending to a first depth of the ribbon from the first surface. In some examples of the method 600 and the apparatus described herein, the operations, features, means, or instructions for concurrently heating the second volume using the second heat source may further include operations, features, means, or instructions for scanning the second volume of the ribbon with the second heat source while the first volume and the second volume are heated by the first heat source.

Some examples of the method 600 and the apparatus described herein may further include operations, features, means, or instructions for depositing, before concurrently heating using the first heat source and the second heat source, one or more seed crystals on the polycrystalline material of the ribbon, where an orientation of the crystalline material is based on a shape of the one or more seed crystals, or an orientation of the one or more seed crystals, or both. Some examples of the method 600 and the apparatus described herein may further include operations, features, means, or instructions for moving the ribbon relative to the second heat source at a rate that is at least 0.2 inches per minute.

In some examples of the method 600 and the apparatus described herein, the first heat source includes a convection-type heat source, or a first radiation-type heat source, or a combination thereof, for heating at least the first volume. In some examples of the method 600 and the apparatus described herein, the second heat source includes a second radiation-type heat source for irradiating the second volume with photons, the first volume being larger than the second volume. In some examples of the method 600 and the apparatus described herein, the first heat source includes at least one of a flame, or an oven, or a furnace, or a microwave. In some examples of the method 600 and the apparatus described herein, the second heat source includes at least one of a laser or a focused IR source.

Some examples of the method 600 and the apparatus described herein may further include operations, features, means, or instructions for heating the first volume of the ribbon using a third heat source, the first volume including a first subset of the polycrystalline material and a second subset of the crystalline material. Some examples of the method 600 and the apparatus described herein may further include operations, features, means, or instructions for concurrently heating, using a fourth heat source while the ribbon is moving relative to at least the fourth heat source and using the third heat source, the second volume of the ribbon that is within the first volume, where heating using the third heat source and the fourth heat source converts at least a portion of the first subset of the polycrystalline material of the ribbon within the second volume to the crystalline material including the one or more grains that are larger than the plurality of grains of the polycrystalline material, and where a depth of the crystalline material of the ribbon increases based on concurrently heating using the third heat source and the fourth heat source.

In some examples of the method 600 and the apparatus described herein, heating using the first heat source and the second heat source converts at least the portion of the polycrystalline material of the ribbon within the second volume to the crystalline material while the ribbon is in a solid state. In some examples of the method 600 and the apparatus described herein, the polycrystalline material of the ribbon is at least partially sintered.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks, components, and modules described in connection with the disclosure herein may be implemented or performed with a general-purpose processor. A general-purpose processor may be a microprocessor, but in the alternative, the processor may be any processor, controller, microcontroller, or state machine. A processor may also be implemented as a combination of computing devices.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person having ordinary skill in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A ribbon, comprising:
   a first volume extending from a first side of the ribbon to a first depth of the ribbon and comprising a polycrystalline material; and
   a second volume extending from a second side of the ribbon opposite the first side of the ribbon to a second depth of the ribbon and comprising a crystalline material having a grain size of at least 100 micrometers and comprising one or more grains that are larger than a plurality of grains of the polycrystalline material, wherein the second depth is at least 1 micrometer,
   wherein the ribbon is not a tube.

2. The ribbon of claim 1, wherein the polycrystalline material comprises a polycrystalline ceramic material, or polycrystalline metal material, or a semiconductor material, and wherein the crystalline material comprises a sapphire material or a single crystal material.

3. The ribbon of claim 1, wherein a lateral dimension of the grain size of the crystalline material is at least 1 millimeter and a longitudinal dimension of the grain size is at least 1 millimeter.

4. The ribbon of claim 1, wherein the second depth of the second volume extends to about a thickness of the ribbon, the thickness of the ribbon being up to 1000 micrometers.

5. The ribbon of claim 1, wherein the one or more grains of the crystalline material are oriented in a first direction, and wherein a basal plane of the crystalline material is aligned with a plane of the ribbon based at least in part on the one or more grains of the crystalline material being oriented in the first direction.

\* \* \* \* \*

UNITED STATES PATENT AND TRADEMARK OFFICE
CERTIFICATE OF CORRECTION

PATENT NO. : 11,584,656 B2
APPLICATION NO. : 17/221913
DATED : February 21, 2023
INVENTOR(S) : Thomas Dale Ketcham et al.

It is certified that error appears in the above-identified patent and that said Letters Patent is hereby corrected as shown below:

On the Title Page

In Column 2, under "Other Publications", Line 1, delete "2012811 2;" and insert -- 2012811.2; --.

Signed and Sealed this
Twenty-sixth Day of November, 2024

Katherine Kelly Vidal
*Director of the United States Patent and Trademark Office*